Figure 1:
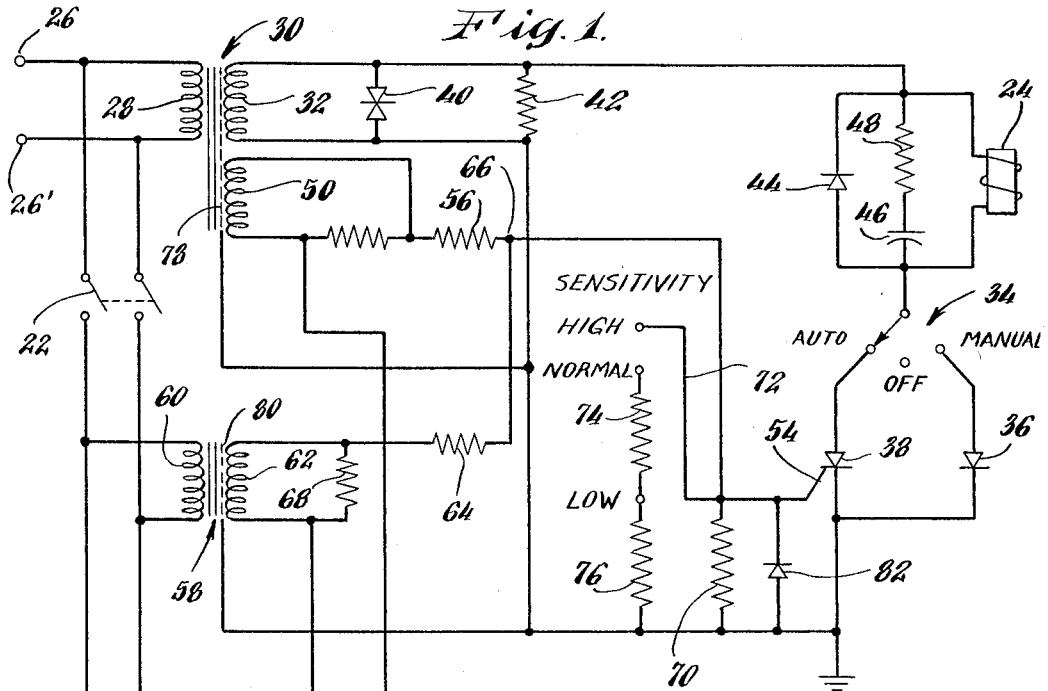

INVENTOR.
Battle H. Klyce
BY
Blair & Buckles
ATTORNEYS.

United States Patent Office 3,279,379
Patented Oct. 18, 1966

3,279,379
LIQUID LEVEL CONTROL
Battle H. Klyce, Stamford, Conn., assignor to
Regent Controls, Inc., Stamford, Conn.
Filed Jan. 21, 1964, Ser. No. 339,304
11 Claims. (Cl. 103—25)

This invention relates to a control system for maintaining a liquid level within predetermined limits in a container, and more particularly for liquids having a relatively low electrical conductivity, which may vary in conductivity over a relatively wide range.

In the processing of liquids automatic control of the liquid level in intermediate tanks is desirable for obvious reasons of efficiency. As an example, milk processing in particular will be referred to throughout the specification but it should be understood that the control system is applicable to use with a variety of liquids. In the processing of milk for instance, it is required by sanitary codes that the tanks and piping in the milk gathering and processing systems be cleaned often and thoroughly. The liquid level control described herein functions equally as well with a cleaning solution or water as it does with milk.

Some of the problems encountered in liquid level control concern safety of operation, efficiency of the pumping system, electrolysis on probes, and with many liquids, as with milk, the problem of foam prematurely operating the pump system. Each of these difficulties is overcome by this invention, as will be more fully described herein.

Accordingly, it is a principal object of this invention to provide an improved liquid level control system which meets the stringent requirements of sanitary codes for the food processing industries, and which is adapted to maintain a liquid level in a container within predetermined limits, regardless of variations in the liquid characteristics.

Another object of this invention is to provide a liquid control system of the above character that is inexpensive to manufacture, install and operate.

A further object of this invention is to provide a liquid control system of the above character employing electrical control means that will operate efficiently when used with a variety of liquids having a relatively wide range of electrical conductance.

Another object of the present invention is to provide a liquid level control system of the above character that permits efficient cleaning of the operative elements in contact with the liquid, without the necessity of removing such elements from the system.

A further object of the invention is to provide a liquid level control system of the above character that is safe for personnel operating the associated equipment.

Another object of the invention is to provide a liquid level control system of the above character that will not be operated by the presence of foam between the electrical control contacts.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

Figure 2:
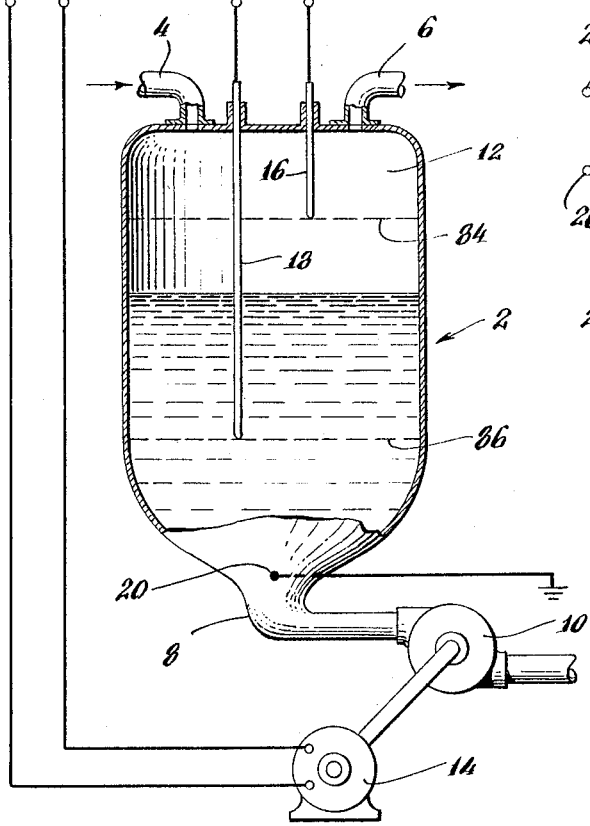
Figure 2:
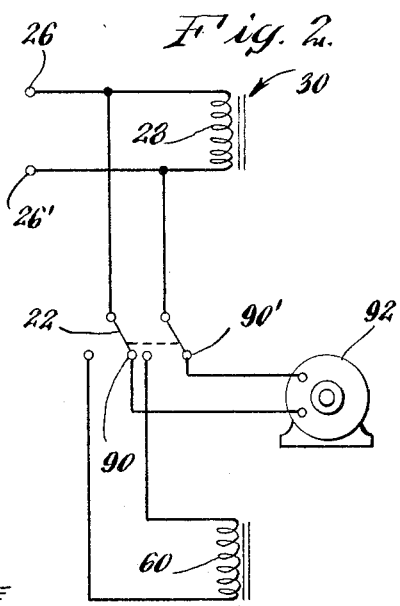

For a better understanding of the nature and objects of the invention, reference should be had to the following detailed description taken in connection with the accompanying drawings, in which:

FIGURE 1 is a schematic representation of a preferred embodiment of the electrical circuitry and liquid tank probe elements; and FIGURE 2 discloses a slight modification of the circuitry of FIGURE 1 adapting the invention to control the filling of a liquid tank.

A typical application of a preferred embodiment of the invention as used in milk processing is illustrated in the drawings. In modern dairy systems milk gathering is accomplished by milking machines which operate on a vacuum principal in a well known manner. The required vacuum is generally created in a vacuum tank, the vacuum tank being connected by piping to the various milking machines. Liquid level control in such a tank is a very important factor as will now be more fully explained.

As shown in the drawings, a vacuum tank 2 is provided with a milk inlet 4 which is connected to the milking machines (not shown) and an air exhaust outlet 6 which is connected to a vacuum pump (not shown). At the bottom of the vacuum tank there is provided a milk outlet 8 which is connected to a liquid pump 10 for moving the milk from the vacuum tank to storage tanks or other stages of the milk processing. The vacuum pump is running continuously and maintains a vacuum in the space 12 above the milk in the tank. This vacuum is utilized to draw milk from the cows through the connecting lines from the milking machines and into the tank through milk inlet 4.

In such a milking system it can readily be seen that if the milk level should rise to the top of the tank, milk would be drawn through air exhaust outlet 6 and through the vacuum pump. To prevent this, the liquid pump must maintain the level of the milk in tank 2 at some distance from its top. Likewise should the liquid pump draw all the milk out of the tank it would break the vacuum to the milking machines, causing a disruption of the flow of milk from the machines. Therefore it can readily be seen that it is necessary in such a system to operate the liquid pump periodically in order to maintain the liquid level in the tank between an upper and lower limit.

For maintaining the liquid level within predetermined limits, a pair of probes extending to different levels are utilized, as well as a ground connection at the bottom of the tank. The circuitry of the system is such that the liquid pump 10 is operated by an electric motor 14 whenever the liquid level reaches an upper probe 16 and will be de-energized by a predetermined resistance between a lower probe 18 and a ground connection 20.

Ideally the control for the liquid pump 10 should not be triggered by foam on the surface of the liquid but, in practice, it is found that slightly premature energization of the liquid pump and slightly delayed de-energization thereof occasioned by the presence of foam does not prejudice the operation of the milking system. More importantly, and unlike certain prior art pump controls, the present control does not depend for its operation on the electrical resistance between probes and is unaffected by foam clinging between the probes.

In the processing of many liquids, and in milk processing in particular, it is necessary to clean the tanks and lines periodically, at the conclusion of each operation. This cleaning is normally done by a detergent cleaning solution that is usually pumped through the system in the same manner that the milk is passed through the system. The sensitivity of the control circuit then must be such so as to operate the liquid pump 10 in the identical manner when cleaning solution, or rinse water is passed through the system. The problem of safety, of course, is also present and the circuit of the invention has been designed so that only a small voltage and current will pass through the circuit even in the event of direct contact with the probes 16 and 18.

Now referring to the control circuit itself, to control the operation of the liquid pump 10 relay contacts 22 are interposed in the power lines to the pump motor 14. The condition of the relay contacts 22 are in turn controlled by the selective energization of a relay coil 24 operatively coupled to the relay contacts.

A 60 cycle, 230 volt power line is connected to line terminals 26, 26'. A primary winding 28 of a step-down transformer 30 is connected across line terminals 26, 26' as are the power lines to the pump motor 14. A secondary winding 32 has one side connected to ground through the relay coil 24, a selector switch 34 and either a rectifier 36 or a controlled rectifier 38. The other side of the secondary winding 32 is connected directly to ground. A bipolar voltage limiter 40 connected across the secondary winding 32 serves to limit the maximum secondary voltage to a safe value and thus protects the circuit from voltage surges due to lightning disturbances or other external causes. A resistor 42 also connected across the secondary winding 32 minimizes switching transients developed in transformer 30 when the power line is disconnected from line terminals 26, 26'. A diode 44 and the series combination of a capacitor 46 and a resistor 48 are each connected across the relay coil 24 to prevent the relay contacts 22 from chattering.

An additional secondary winding 50 of transformer 30 has one side connected through a resistor 56 to a gate terminal 54 of controlled rectifier 38 while the other side is connected to the upper probe 16. A resistor 56 connected across the secondary winding 50 minimizes switching transients.

A separate transformer 58 is provided for energizing the lower probe 18. A primary winding 60 of transformer 58 is connected to the power lines at a point between the relay contacts 22 and the pump motor 14. A secondary winding 62 has one side connected to the lower probe 18 and the other side connected through a resistor 64 to a junction 66 between the resistor 52 and the gate terminal 54 of controlled rectifier 38. A resistor 68 is connected across the secondary winding 62 of transformer 58 to minimize switching transients.

In order to establish one degree of sensitivity for the control circuit, an appropriately valued resistor 70 is connected between the gate circuit of controlled rectifier 38 and ground. A flexible conductor 72 is provided to connect series resistors 74 and 76 in parallel with resistors 70 or to parallel resistor 70 with resistor 76, as desired, in order to vary the circuit sensitivity. Specifically, with the free end of conductor 72 contacting the blank terminal labelled "high" only the resistor 70 is connected in circuit. On the other hand, with the free end of conductor 72 connected to the terminal labelled "normal" resistor 70 is paralled by both resistors 74 and 76 and the equivalent resistance between the gate circuit of controlled rectifier 38 and ground is reduced thereby reducing circuit sensitivity. Where the resistor 70 is paralleled by resistor 76 by virtue of conductor 72 being connected to the terminal labelled "low" the equivalent resistance is further reduced as is the circuit sensitivity.

As a precautionary measure, each of the transformers 30 and 58 is provided with grounded electrostatic shields 78 and 80, respectively, to effectively isolate the high voltages in the primary windings from the probe circuits.

In addition a diode 82 is connected from the gate circuit of controlled rectifier 38 to ground. Diode 82 functions to remove negative transients in the gate circuit and, in combination with resistors 52 and 64, limits any disturbances arising in the gate circuit due to lightning or other external causes.

In operation, the control circuit, where the selector switch 34 is switched to the contact labelled "auto," functions to automatically control the liquid pump 10 by selectively energizing the pump motor 14 so as to maintain the liquid level in the container 2 between the upper limit 84 and the lower limit 86 corresponding to the depths of submission of the upper probe 16 and the lower probe 18, respectively.

Assuming that the liquid level in the container 2 is as shown in the drawing and the relay contacts 22 are open, i.e. the power lines energizing the pump motor 14 and the primary winding 60 of transformer 58 are dead. The lower probe 18 is not energized. The upper probe 16, however, is energized from the secondary winding 50 of transformer 30 but no current can flow through the gate circuit of controlled rectifier 38 since the circuit from the upper probe 16 to the ground connection 20 through the liquid in container 2 is not completed.

The liquid, such as milk, being drawn into the container 2 from the liquid inlet 4 raises the liquid level eventually to the upper limit 84 whereupon the circuit path through the liquid to the ground connection 20 is completed. Current flows in the gate circuit to develop a voltage across resistor 70 sufficient to fire the controlled rectifier 38. With the controlled rectifier 38 now providing a low impedance path from anode to cathode and ground for positive half cycles of the current induced in the secondary winding 32 of transformer 30, relay coil 24 is energized. In the nature of a feedback response the relay contacts 22 operatively coupled to the relay coil 24 close.

The pump motor 14 is energized and the liquid pump 10 is operated to lower the liquid level in the container 2. Once the liquid level drops below the upper limit 84 the circuit from the upper probe 16 to the ground connection 20 is broken. By virtue of the fact that the primary winding 60 of transformer 58 is now energized and the condition of circuit continuity from the lower probe 18 to the ground connection 20 through the liquid in the container 2, current continues to flow in the gate circuit of controlled rectifier 38 through the alternate path including secondary winding 62, resistor 64 and the lower probe to ground. This alternate path completing the gate circuit current path "latches" the controlled rectifier 38 in its low impedance condition and the relay coil 24 remains energized. With the relay contacts 22 held in this closed condition by continued energization of the relay coil 24, the liquid pump 10 continues to lower the liquid level in the container 2.

Once the liquid level drops below the lower limit 86, the lower probe 18 is completely uncovered and the circuit path through the liquid to ground is broken. Current flow in the gate circuit ceases, controlled rectifier 38 recovers its current blocking characteristic and relay coil 24 is de-energized. Moreover, relay contacts 22 open and the pump motor 14 as well as the primary winding 60 of transformer 58 are de-energized.

This completes the operating cycle of the control system. As the liquid again covers the lower probe 18, the controlled rectifier will not be fired since the transformer 58 is not energized. This condition prevails until such time as the liquid level in the container 2 rises to the upper limit 84 where the tip of the upper probe is again covered with liquid and the operation described above is repeated.

The diode 82 in conjunction with the cathode-gate circuit of the controlled rectifier 38 provides a low impedance path for both halves of the A.C. current energizing the probes 16 and 18. With A.C. energization of the probes, electrolysis is largely prevented.

If it should be desired to completely empty the container 2 of liquid, the selector switch 34 is moved from the contact marked "auto" to the one marked "manual." In this position the controlled rectifier 38 is removed from the circuit and the diode 36 provides a low impedance path for the positive half cycles of the current induced in the secondary winding 32 of transformer 30. The relay coil 24 is energized regardless of the liquid level and the relay contacts 22 are closed permitting continued operation of the liquid pump 10. In the "off" position, the selector switch 34 completely disables the control circuit as well as the pump motor 14.

One of the distinct features of the present invention resides in the placement of the relay contacts 22 solely in the high voltage side of the circuit, e.g., 230 volts. The cleaning action inherent from the normal arcing that occurs when these contacts are opened and closed completely eliminates the usual problems of "dry contact" encountered when the contacts operate in a low voltage, low current circuit, e.g., the probe circuits of the present invention. Moreover, the use of the double pole relay contacts 22 to open both sides of the motor circuit provides an additional safety feature.

Through the use of separate supplies, that is, transformers 30 and 58, the lower probe 18 may be energized only when its "latching" function is required; otherwise it is de-energized, thus conserving power. The upper probe circuit draws current only during the brief period that the liquid level covers the tip of the upper probe 16. Moreover, the use of separate transformers 30 and 58 allows for independent adjustment of the sensitivities of the upper and lower probe circuits, respectively. Apart from the sensitivity adjustment afforded by combination of resistors 70, 74 and 76, the ratios of the transformers 30 (primary winding 28 to secondary winding 50) and 58 may be selected to essentially provide any desired ratio of "pull-in" sensitivity to drop-out sensitivity. The "pull-in" sensitivity is characterized by that value of resistance between the upper probe 16 and the ground connection 20 which will enable the gate circuit to fire the controlled rectifier 38. On the other hand, "dropout" sensitivity is characterized by that value of resistance between the lower probe 18 and the ground connection 20 which will render the gate circuit unable to maintain the controlled rectifier 38 in its low impedance condition. Depending on conditions such as the diverse conductivities of the liquids to be handled, insensitivity to foam, etc., the desired ratio of "pull-in" sensitivity to "drop-out" sensitivity may vary from as high as 4:1 down to 1:1, for example. The extreme flexibility afforded by the use of separate transformers is a distinct advantage since in the handling of milk, for example, which also requires that the control circuit be compatible with water as used to flush and clean the system, the conductivities of these two liquids will vary widely depending on the locale.

From the standpoint of overall practicability it has been determined that, in the handling of milk, the "pull-in" sensitivity should be in the range of 40,000 to 80,000 ohms with an optimum value of approximately 60,000 ohms while the "drop-out" sensitivity should be in the range of 50,000 to 90,000 ohms with an optimum value of approximately 70,000 ohms.

The above-noted sensitivities were achieved using the following circuit values:

Transformer 30 _____ 230 v./22 v. (winding 32)/6.3 v. (winding 50).
Transformer 58 _____ 230 v./35 v.
Resistor 42 _____ 1200 ohms.
Resistor 48 _____ 15 ohms.
Resistor 52 _____ 1100 ohms.
Resistor 56 _____ 220 ohms.
Resistor 64 _____ 1100 ohms.
Resistor 68 _____ 120 ohms.
Resistor 70 _____ 4300 ohms.
Resistor 74 _____ 10000 ohms.
Resistor 76 _____ 4700 ohms.
Capacitor 46 _____ 0.68 mfd.

The foregoing circuit values are merely exemplary and are not intended to limit the invention.

With the modifications shown in FIGURE 2, the control circuit of FIGURE 1 can be used with advantage to control the filling of a liquid storage tank 2. In describing the modification of FIGURE 2, elements corresponding to elements of FIGURE 1 are given identical reference numerals. The remainder of the control circuitry is identical to that shown in FIGURE 1 and has not been duplicated.

In the processing of liquids it is oftentimes necessary to control the liquid level in an intermediate tank by automatically energizing a liquid pump to fill the tank as contrasted to the embodiment of FIGURE 1 where the pump 10 is automatically energized to decrease the liquid level in the tank 2. As seen in FIGURE 2, a power line is connected to terminals 26, 26' for energizing the primary winding 28 of transformer 30. The primary winding 60 of transformer 58 is energized through relay contacts 22 when the liquid covers upper probe 16 in the operating manner of FIGURE 1.

In contrast to FIGURE 1, however, a liquid pump motor 92 driving a liquid pump (not shown) is energized through relay contacts 22 when engaging back stationary contacts 90, 90'. Thus the motor 92 and transformer 58 are alternately energized under the control of the relay movable contacts 22. Although not shown in FIGURE 2, the liquid pump driven by the motor 92 is arranged to pump liquid into a tank equipped with upper and lower probes 16, 18 establishing upper and lower liquid level limits 84, 86 precisely as shown in FIGURE 1.

Thus in operation, with upper probe 16 uncovered and relay coil 24 de-energized, movable relay contacts 22 are in the position shown in FIGURE 2 and the pump motor 92 is energized to effect filling of the tank. Once the upper limit 84 is achieved thereby covering upper probe 16, relay coil 24 is energized to break the energizing circuit to the motor 92 and make the energizing circuit to the transformer 58. The resulting energization of the holding circuit through lower probe 18 maintains the circuit through controlled rectifier 38 for relay coil 24. Upon uncovering of the lower probe 18, the holding circuit is broken, relay coil 24 is de-energized and the movable relay contacts 22 drop out thereby energizing motor 92 to effect filling of the tank.

It is thus seen that the essential operation of the control circuit is the same in each embodiment and the end result, to wit, to maintain the liquid level in a tank between predetermined upper and lower limits 84, 86 (FIGURE 1) is also identical. The only difference is the arrangement of the liquid pump with respect to the tank. This vividly demonstrates the inherent versatility of the control circuit of the invention.

Although the present invention has been described with particular emphasis on its application to the handling of milk, it will be appreciated, of course, that it has general application to systems handling any electrically conductive liquid.

It will thus be seen that the objects set forth above, among those made apparent from the preceding description, are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

Having described my invention, what I claim as new and desire to secure by Letters Patent is:

1. A liquid level control for maintaining the level of a liquid in a container between upper and lower limits, said control comprising (A) a first probe submerged in said liquid to said upper limit (B) a second probe submerged in said liquid to said lower limit (C) a ground terminal positioned in said liquid below said lower limit
(D) an electrical source,
(E) a pump operating to decrease the level of said liquid,
(F) a first transformer having
    (1) a primary winding energized by said source
    (2) a first secondary winding and
    (3) a secondary winding connected to said first probe
(G) a relay having
    (1) an operating coil connected to said first secondary winding of said first transformer and
    (2) switch contacts operating in response to energization of said relay coil for completing the energizing circuit between said source and said pump,
(H) a second transformer having
    (1) a primary winding connected in the circuit between said switch contacts and said pump and
    (2) a secondary winding connected to said second probe,
(I) a controlled rectifier connected in series with said relay coil and said first secondary winding of said first transformer, said control rectifier including
    (1) a gate circuit connected in common with said first and second probes for initially enabling said control rectifier so as to energize said relay coil only when
        (a) a first circuit is completed from said first probe to said ground terminal through said liquid and
        (b) subsequently enabling said control rectifier as long as a second circuit is completed from said second probe to said ground terminal through said liquid.

2. The device claimed in claim 1 which further includes
(J) a first diode,
    (1) said diode being poled so as to function in conjunction with said controlled rectifier to pass A.C. current in the circuits including said first and second probes.

3. The device claimed in claim 2 which further includes
(K) a selector switch interconnected between said relay coil and said controlled rectifier, said selector switch
    (1) operating to by-pass said controlled rectifier when continuous energization of said relay coil is desired.

4. A liquid level control for maintaining the level of a liquid in a container between upper and lower limits, said control comprising
(A) a first probe submerged in said liquid to said upper limit
(B) a second probe submerged in said liquid to said lower limit
(C) a ground terminal positioned in said liquid below said lower limit
(D) an electrical source,
(E) a pump operating to decrease the level of said liquid,
(F) a first transformer having
    (1) a primary winding energized by said source
    (2) a first secondary winding and
    (3) a second secondary winding connected to said first probe
(G) a second transformer having
    (1) a primary winding and
    (2) a secondary winding connected to said second probe
(H) a relay having
    (1) an operating coil connected to said first secondary winding of said first transformer and
    (2) switch contacts operating in response to energization of said relay coil for completing the energizing circuit between said source and both said pump and the primary winding of said second transformer,
(I) a semiconductor switch connected in series with said relay coil and said first secondary winding of said first transformer, said switch including
    (1) an enabling input circuit connected in common with said first and second probes for initially enabling said switch so as to effect energization of said relay coil when
        (a) a first circuit is completed from said first probe to said ground terminal through said liquid and
        (b) subsequently enabling said control rectifier as long as a second circuit is completed from said second probe to said ground terminal through said liquid.

5. The device claimed in claim 4 wherein said semiconductor switch comprises a controlled rectifier.

6. The device claimed in claim 5 which further includes
(J) a variable impedance network connected to said enabling circuit and functioning to seelctively vary the sensitivity of said controlled rectifier to the impedances of said first and second circuits through said liquid.

7. A liquid level control for maintaining the level of a liquid in a container between upper and lower limits, said control comprising
(A) a first probe submerged in said liquid to said upper limit,
(B) a second probe submerged in said liquid to said lower limit
(C) a ground terminal positioned in said liquid below said lower terminal,
(D) a pump operating to change the level of said liquid in said container,
(E) a first electrical source of low voltage alternating current connected to said first probe,
(F) a second electrical source of low voltage alternating current connected to said second probe,
(G) an electrically controlled switch operating to render said second source effective to energize said second probe and to energize said pump,
(H) an electronic switch including
    (1) an enabling circuit connected to both said first and second sources for initially enabling said electronic switch to operate said electrically controlled switch only when
        (a) a first circuit is completed from said first probe to said ground terminal through said liquid and
        (b) for subsequently enabling said electronic switch as long as a second circuit is completed from said second probe to said ground terminal through said liquid.

8. The device claimed in claim 7 wherein said first and second electrical sources comprise first and second stepdown transformers, respectively,
    (1) said electrically controlled switch being disposed in the high voltage circuit of said second transformer.

9. The device claimed in claim 7 wherein said electrically controlled switch operates to simultaneously energize said pump and render said second source effective to energize said second probe.

10. The device claimed in claim 7 wherein said electrically controlled switch operates to alternately energize said pump and render said second source effective to energize said second probe.

11. A liquid level control system for maintaining the level of a liquid in a container between upper and lower limits, said system comprising (A) a first probe submerged in said liquid to said upper limit,
(B) a second probe submerged in said liquid to said lower limit,
(C) a ground terminal positioned in said liquid below said lower limit,
(D) a first electrical source of alternating current connected to said first probe,
(E) a second electrical source of alternating current connected to said second probe,
   (1) said alternating current sources comprising, respectively, first and second step-down transformers
(F) a pump operating to decrease the level of said liquid,
(G) an electrically controlled switch operating to simultaneously energize said second probe and said pump from said second source,
   (1) said electrically controlled switch being disposed in the high voltage circuit of said second transformer,
(H) a controlled rectifier forward biased by said first source and including
   (1) a gate circuit connected to both said first and second sources for initially enabling said controlled rectifier to operate said switch only (a) when the electrical resistance of the path through said liquid between said first probe and said ground terminal is less than an upper limit range of 40,000–80,000 ohms to complete a first circuit from said first probe to said ground terminal through said liquid and
(b) for holding said controlled rectifier enabled so long as the electrical resistance of the path through said liquid between said second probe and said ground terminal does not exceed a limit of 50,000–90,000 ohms.

References Cited by the Examiner

UNITED STATES PATENTS

| | | | |
|---|---|---|---|
| 3,030,890 | 4/1962 | Galik | 137—392 |
| 3,131,335 | 4/1964 | Berglund et al. | |
| 3,170,479 | 2/1965 | Mueller | 73—304 X |
| 3,206,615 | 9/1965 | LaPointe. | |

FOREIGN PATENTS 905,861   9/1962   Great Britain.

LOUIS R. PRINCE, *Primary Examiner.*

S. CLEMENT SWISHER, *Assistant Examiner.*